United States Patent [19]

Woods

[11] 4,211,004
[45] Jul. 8, 1980

[54] STRING-TYPE WEED CUTTER WITH MECHANICAL LINE FEED
[75] Inventor: Donald M. Woods, Houston, Tex.
[73] Assignee: Emerson Electric Co., St. Louis, Mo.
[21] Appl. No.: 624,928
[22] Filed: Oct. 22, 1975
[51] Int. Cl.² .............................................. B26B 27/00
[52] U.S. Cl. ....................................... 30/276; 56/12.7; 56/295; 242/54 R
[58] Field of Search ........................ 56/12.7, 295, 17.5; 30/276, 347; 242/54 R

[56] References Cited
U.S. PATENT DOCUMENTS

| 3,664,102 | 5/1972 | Reber | 56/295 |
| 3,826,068 | 7/1974 | Ballas | 56/12.7 |
| 3,831,278 | 8/1974 | Voglesonger | 56/295 X |
| 3,928,911 | 12/1975 | Pittinger, Jr. | 30/276 |

Primary Examiner—J. N. Eskovitz

[57] ABSTRACT

A weed cutter employing a revolving flexible non-metallic line as a cutting member is provided with means for mechanically feeding out additional line to replace lengths broken during operation of the cutter. A rotatable spool is provided for storing extra line in a coiled configuration, with the unwound portion being threaded into and through a hollow motor shaft, and through a channel in the rotatable head of the cutter to an exit aperture at its periphery. A control mechanism is further provided whereby the spool may be rotated to feed out preselected increments of line when desired, and to oppose rotation of the spool when not desired so as to prevent inadvertent unreeling of cutting line.

29 Claims, 10 Drawing Figures

U.S. Patent  Jul. 8, 1980  Sheet 3 of 4  4,211,004
FIG.5
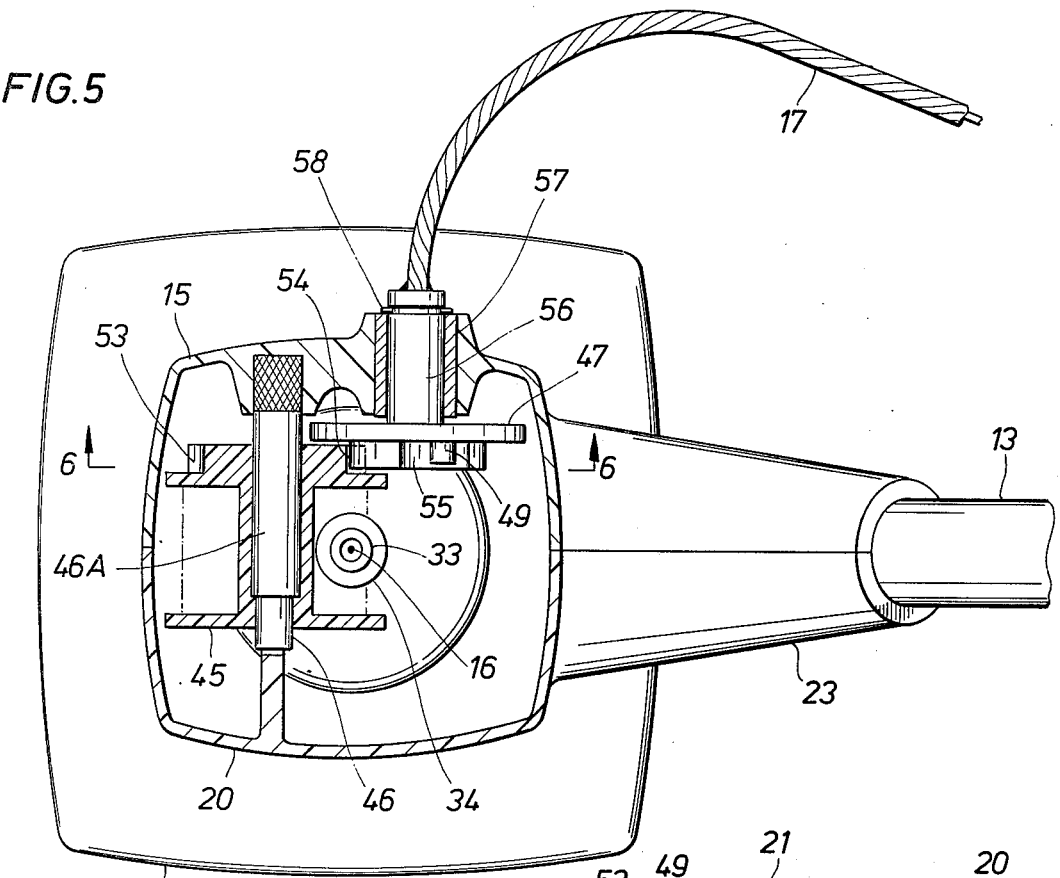
FIG.6
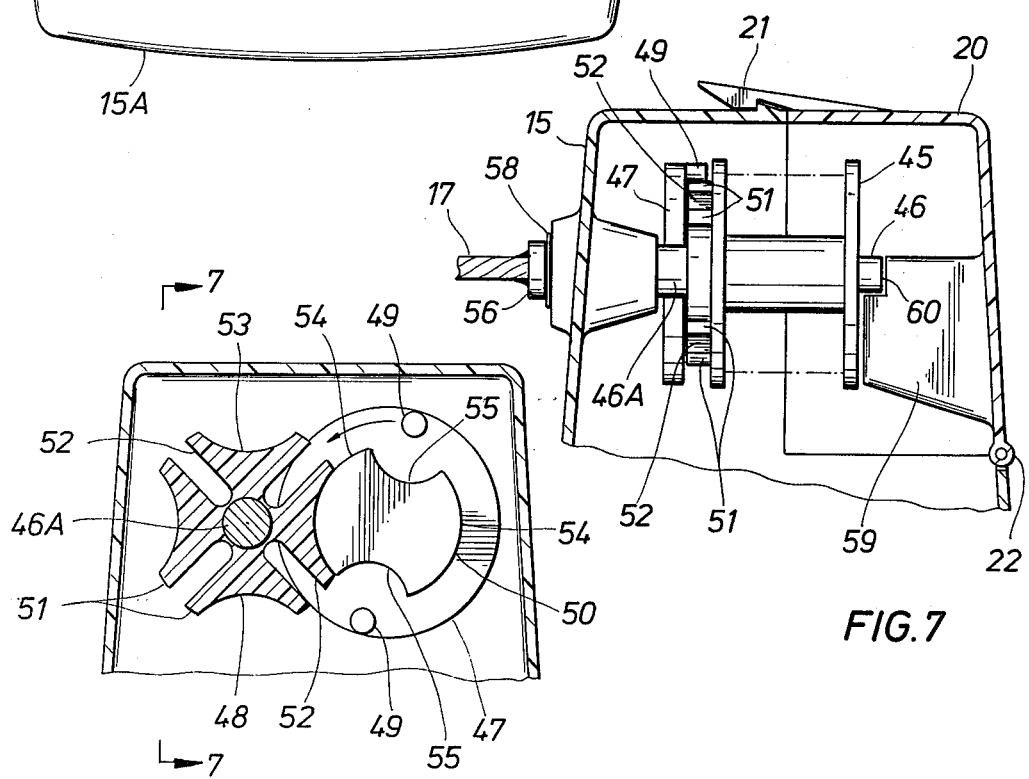
FIG.7

STRING-TYPE WEED CUTTER WITH MECHANICAL LINE FEED

BACKGROUND OF INVENTION

This invention relates to methods and apparatus for cutting vegetation and the like, and more particularly relates to improved methods and apparatus for cutting vegetation with a flexible non-metallic string or line member or the like.

Lawn mowers and trimmers which employ a moving steel blade are well known, but are also well known to be subject to certain inherent disadvantages. In particular, such devices cannot reach vegetation which is adjacent fences, walls, trees and the like. More especially, any device which revolves a rigid metallic blade at a relatively high velocity is inherently dangerous to persons and property within its vicinity. However, these and other disadvantages of conventional cutters have now been overcome with a type of trimmer which employs a flexible non-metallic string or line, and which is more particularly described in U.S. Pat. No. 3,708,967; No. 3,826,068; and No. 3,859,776.

Contrary to presupposition, a plastic string can usually cut vegetation almost indefinitely without breaking, provided the string engages only vegetation of the type sought to be cut. On the other hand, it will also be apparent that if a plastic string does impact against a resistive object, such as a concrete wall or chain link fence or the like, the string or line will be more likely to break than will a rigid steel blade. Since this type of cutter is expressly intended to be used to cut vegetation adjacent such resistive objects, it will not be surprising that the string or line will often experience breakage, and that the string or line must therefore be replaced from time-to-time.

As shown in the aforementioned patents, it has been found necessary and desirable to provide these trimmers with a spool having a substantial length of cutting line coiled therein, and to employ only a short unwound portion of the line as the cutting member. Thus, if a portion of the extended cutting portion of the line becomes damaged or broken, the cutting member may be quickly and inexpensively replaced by merely manually unwinding a new portion of line from the spool, and extending this unwound portion to form the new cutting member.

This manner of providing replacement cutting line has been found to be subject to certain problems, however. As may be seen in the aforementioned patents, it is desirable to protect the coiled portion of the line from moisture and debris by enclosing it in a circular head member, and to extend the unwound portion through a peripheral aperture in this head member to form the cutting member. Therefore, if the string breaks at a point at or within the head member, it is often necessary to remove and disassemble the head member in order to gain access to the head member.

Another problem with providing for manually unwinding cutting line from its spool arises from the fact that the spool is recessed snugly within the circular head member to prevent the line from escaping from the spool and head member during revolvement of the spool and head member. Thus, when it is desired to withdraw or unwind more cutting string, it is necessary to draw the string about the edge of the flange of the spool, while the string is wedged between the rim of the flange and the surface of the housing, and this tends to damage the cutting line or string. Either that, or else it is necessary to bend the flange away from the head to provide more clearance from the cutting line, which tends to damage the spool. In either case, it will be apparent that this, in turn, tends to greatly reduce the overall convenience of this type of cutting apparatus, and to create an operating problem which is not present in more conventional cutters.

It has been proposed to overcome this and other related disadvantages by providing such equipment with means for mechanically extending or feeding out lengths of cutting line from the head member whenever desired. In this regard, a mechanical feed mechanism has been proposed in U.S. Pat. No. 3,664,102, which is designed for use with apparatus employing a plurality of metallic wires as cutting members. Such a feed mechanism is clearly not appropriate, of course, in apparatus employing only a single flexible cutting line, and especially when the line is formed of a plastic rather than a metal.

These disadvantages of the prior art are overcome with the present invention, and novel means and methods for cutting vegetation are herewith provided with feed means and techniques whereby plastic cutting line may be fed out of the cutting head without incurring damage to the cutting line or any other portion of this apparatus.

SUMMARY OF INVENTION

In an ideal embodiment of this invention, a trimmer assembly of the type more particularly depicted in U.S. Pat. No. 3,859,776 is modified to incorporate an electric motor having a hollow or tube-like shaft, and a rotatable head member having a tubular line-bearing passageway extending from a junction adjacent the lower end of the hollow motor shaft to the periphery of the head member. In addition, a rotatable spool having a length of cutting line coiled thereon is preferably mounted within or adjacent the upper end of the motor housing, whereby the unwound portion of the cutting line extends down into and through the hollow motor shaft, and thence into and through the passageway through the head member, until it extends laterally or radially from the periphery of the revolving head member in a conventional manner.

A suitable actuating mechanism will also preferably be included, which is operable from a point at the upper end of the trimmer handle, and which is also connected to not only feed out a preselected length of cutting line from the head member whenever desired, but which also opposes discharge of cutting line except when desired. Thus, accidental unwinding of cutting line, as when the line becomes entangled with saplings and the like, will be effectively prevented.

The head member is, of course, preferably provided with a diameter which is substantially greater than its axial thickness. Since the head member is concentrically as well as axially mounted on the end of the hollow motor shaft, it will be apparent that the cutting string will be turned at a right angle within the head member. Thus, the cutting line will be continuously revolved about its own axis as the head member is rotated by the hollow motor shaft. For this reason, the passageway in the head member is preferably provided by a metal tubular member having a diameter substantially greater than that of the line member, in order that the cutting line does experience any binding within the head member during operation of the equipment.

In this ideal arrangement, a preselected replacement length of cutting line may be fed out of the head member whenever desired and even during operation of the equipment. A plastic line will, of course, not be as stiff or rigid as if it were made of steel wire as taught by Reber U.S. Pat. No. 3,664,102, but even if the line tends to stand in the motor shaft or housing during rotation of the storage spool, rather than being thrust down through the hollow motor shaft and through the head member, rotation of the head member will then draw the line into a proper cutting position as in the case of prior-art cutters.

These and other features and advantages of the present invention will become apparent from the following detailed description, wherein reference is made to the accompanying drawings.

IN THE DRAWINGS

FIG. 5 is another simplified pictorial representation, partly in cross section, of the trimmer depicted in FIG. 3, but providing a different view of the mechanical feed mechanism incorporated therein for selectively paying out preselectedly lengths of replacement cutting line.

FIG. 6 is another simplified pictorial representation, partly in cross section, of a selected portion of the actuating mechanism which, in turn, controls the feed mechanism.

FIG. 7 is another simplified pictorial view of the actuating and feed mechanisms depicted in FIGS. 3-6.

DETAILED DESCRIPTION

Figure 1:
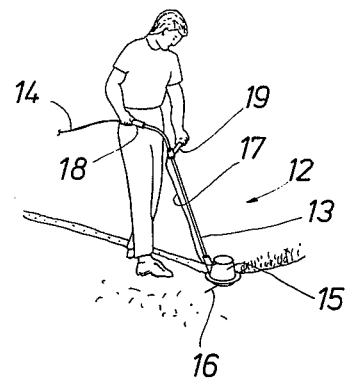
FIG. 1 is a simplified pictorial representation of a string-type cutter being operated to cut vegetation and having a mechanical feed mechanism of the type hereinbefore described.

Referring now to FIG. 1, there may be seen a simplified pictorial representation of a string-type trimmer apparatus of the type hereinbefore discussed being used to cut vegetation along a walk or garden path. More particularly, the apparatus may be seen to be composed of a trimmer assembly 12 having an elongate handle whereby the operator may employ the apparatus without assuming a stooped position. The trimmer assembly 12 will further be seen to have a motor housing 15 connected to the lower end of the handle 13, and a pair of hand grips 18 and 19 for carrying purposes. In addition, if the motor housing 15 encloses an electrically driven motor, the trimmer assembly 12 may further include an electric cord 14 for delivering power to a suitable motor within the housing 15.

Referring again to FIG. 1, there may be seen a length of flexible non-metallic string or line interconnected to the lower portion of the apparatus for rotation in a flail-like manner for cutting the vegetation. As previously explained, this cutting line 16 is necessarily revolved at a relatively high velocity and therefore is subject to occasional breakage. Accordingly, and as will hereinafter be explained in detail, the lower hand grip 19 is preferably adapted to provide means for mechanically extending an additional length of cutting line 16, and thus the lower grip 19 is preferably connected to rotate a flexible shaft or cable 17 which extends into the motor housing 15.

Figure 2:
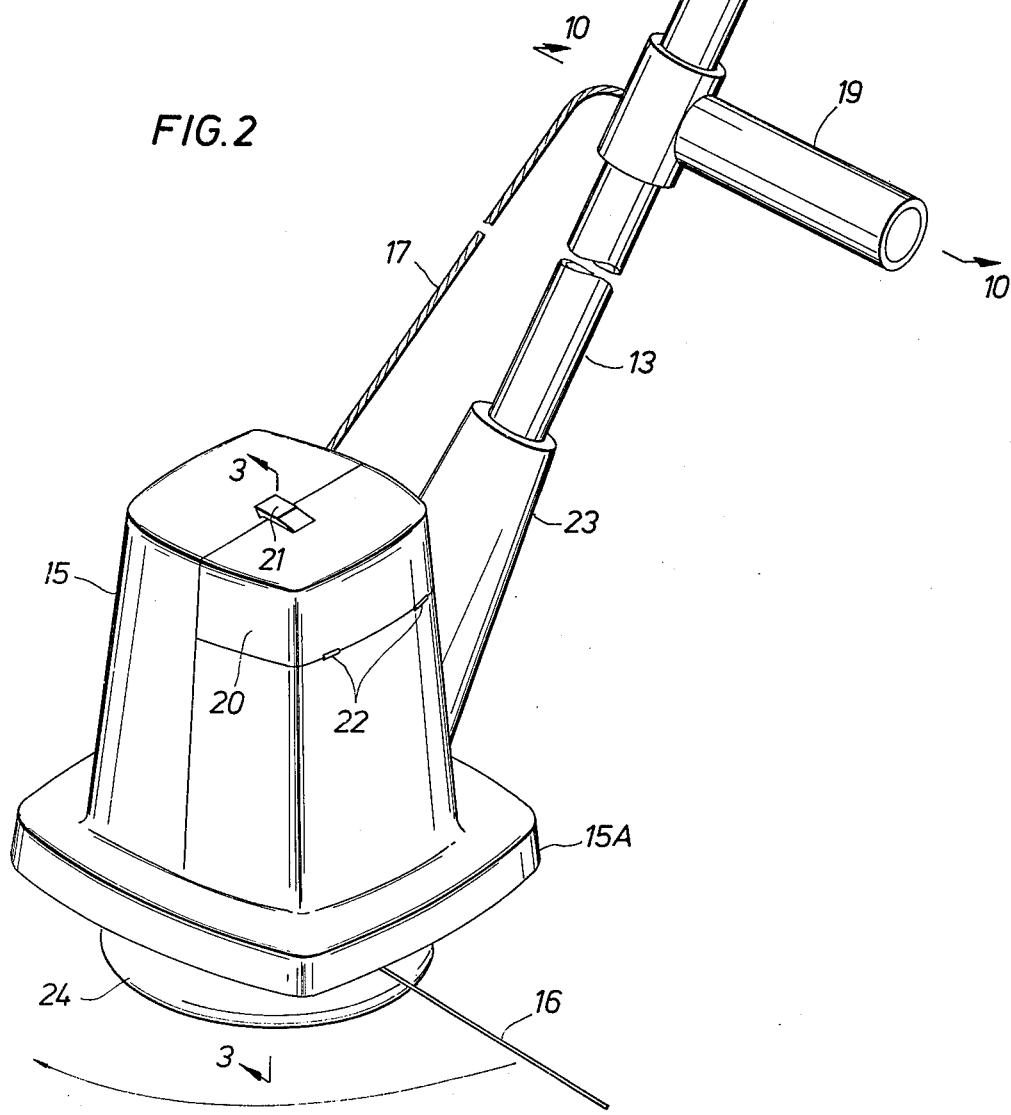
FIG. 2 is a simple but more particular pictorial representation of the lower portion of the trimmer or string-type cutter depicted generally in FIG. 1.

Referring now to FIG. 2, there may be seen a more detailed pictorial illustration of the trimmer assembly 12 depicted in FIG. 1 and wherein the cutting line 16 is shown to be fixed at and extending from a rotatable circular head member 24 which, in turn, is rotatably interconnected with the motor (not depicted in FIG. 2) mounted within the motor housing 15. More particularly, the motor housing 15 may be provided with a suitable neck portion 23 which, in turn, angularly projects upward from the skirt portion 15A to receive and connect with the lower end of the tubular handle 13. As hereinbefore explained, the upper end of the handle 13 is preferably provided with a suitable upper hand grip 18 with provision for receiving and admitting the electrical cord 14 into the handle 13, and with further provision for supporting a suitable electrical control switch 18A in the event the head member 24 is driven by an electric motor (not depicted). The lower hand grip and feed control lever 19 is preferably mounted a suitable distance below the upper hand grip 18, whereby the trimmer assembly 12 may be carried with two hands being used to sever vegetation.

As will hereinafter be explained in greater detail, the cutting line 16 is preferably provided as a single length of flexible line in an amount suitable for cutting vegetation over an extended period of time. To accommodate and allow for occasional breakage, it will therefore be apparent that a relatively long length of line may necessarily be provided with equipment of this type. Thus, the greater portion of the cutting line 16 is preferably wound upon a storage spool (not depicted in FIG. 2), or other suitable means, which spool is also preferably disposed within the upper end of the motor housing 15. To provide for access to this spool (not depicted), the motor housing 15 is preferably provided with a lid 20 which may be conveniently lifted to expose the spool, and which is locked into closed position by means of a latch 21. Pivotal movement of the lid 20 with respect to the housing 15 may be provided by hinges 22 or any suitable means.

The head member 24 may, of course, be revolved or driven by any suitable type of driving means. It is conventional to employ a gasoline-driven engine to rotate a multi-string head member, and to employ an electric motor to revolve a head member carrying only a single cutting string. Accordingly, this invention will hereinafter be discussed with respect to use of an electric motor.

Figure 3:
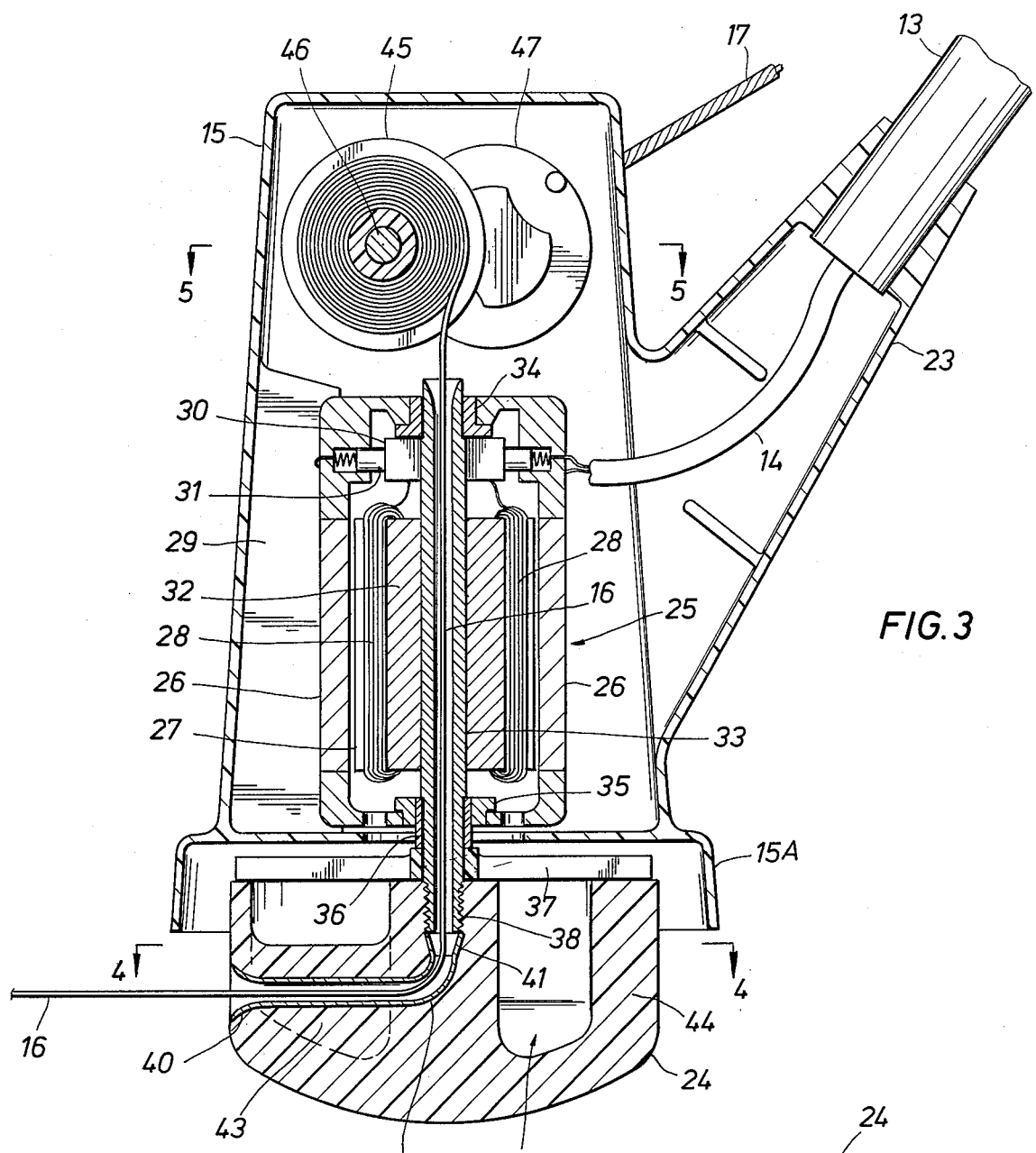
FIG. 3 is a more detailed illustration, partly in cross section, of the apparatus depicted in FIGS. 1 and 2, and more particularly showing the specifics of a feed mechanism suitable for these purposes and embodying the concept of the present invention.

Referring now to FIG. 3, there may be seen a detailed illustration, partly in cross section, of the lower end of the trimmer assembly 12 depicted more generally in FIGS. 1 and 2. As hereinbefore stated, the flexible cutting line 16 is interconnected with a rotatable head member 24 which, in turn, is fixedly mounted to the shaft 33 of a suitable electric motor 25 which, in turn, is actuated by electric power received through the electrical cable 14 within the tubular handle 13. The motor 25 is fixedly supported within the housing 15 by means of a mounting bracket 29, and is composed of an armature 27 having coils 28 conventionally wound about a pole piece 32 which, in turn, is mounted on a hollow motor shaft 33. As may be further seen in FIG. 3, the electrical cable 14 is interconnected with brushes 31 which, in turn, engage the commutator 30 to deliver current to the coils 28. The magnetic field is suitably provided by means of permanent magnets 26 which are suitably mounted about the coils on the armature 27.

The hollow shaft 33 may be seen to be supported at its upper end by bearing 34 and at its lower end by a lower bearing 35 which, in turn, supports a spacer sleeve 36 for positioning the head 24 on the shaft 33.

Referring now to the rotatable head 24, this component may be seen to be threadedly connected to the lower end of the hollow motor shaft 33 by means of threads 38. The purpose of the head assembly 24 is to provide for extension of a free traveling length of the cutting line 16, and to further rotate that free traveling length of cutting line 16 in response to rotation of the hollow motor shaft 33. As previously stated, the major portion of the cutting line 16 is wound on the storage spool 45 within the motor housing 15 whereby only a portion of the cutting line 16 extends from the periphery of the rotatable head assembly 24.

Referring now to FIG. 3, there may be seen a suitable spool 45 which is rotatably mounted on a fixedly positioned shaft 46, and which is provided with a coiled portion of the cutting line 16. As may further be seen, the unwound portion of the cutting line 16 extends downward through the hollow motor shaft 33 and also through a passageway provided in the rotatable head assembly 24 by a metallic tube member 39 having an upper flared end 41 adjacent and mated with the lower threaded end of the hollow motor shaft 33, and further having a flared exit end 40 located at the periphery of the circular head member 24 for providing an exit aperture for the free traveling end of the cutting line 16. The tubular member 39 may be conveniently made of any suitable metallic material to provide a suitable bearing surface for the revolving plastic cutting line 16, at the point where it bends when it turns from a vertical to a horizontal position, as it passes through the head member 24. Further the angle of curvature of the flared exit end 40 is preferably great enough to provide a bearing surface to support the cutting line 16 against angular deformation and resultant breakage during operation of the trimmer 2.

Referring again to FIG. 3, it will be seen that the spool 45 is rotated in a clockwise direction in order to pass cutting line 16 down through the motor shaft 33 and out through the exit end 40 of the tubular member 39. Rotation of spool 45 is preferably achieved by the actuator 47 which, in turn, is controlled by the flexible shaft or cable 17, as will hereinafter be explained in detail.

Referring again to FIG. 3, it will be noted that the upper side of the head member 24 is preferably provided with a plurality of fins 37 arranged thereon in a radial pattern. The purpose of the fins 37 is merely to produce an air flow through the handle 13, and over the motor 25, for the purpose of maintaining the motor 25 at a safe operating temperature. Thus, the handle 13 may suitably be provided with vents or other apertures (not depicted) at a location such as to facilitate such air flow.

Figure 4:
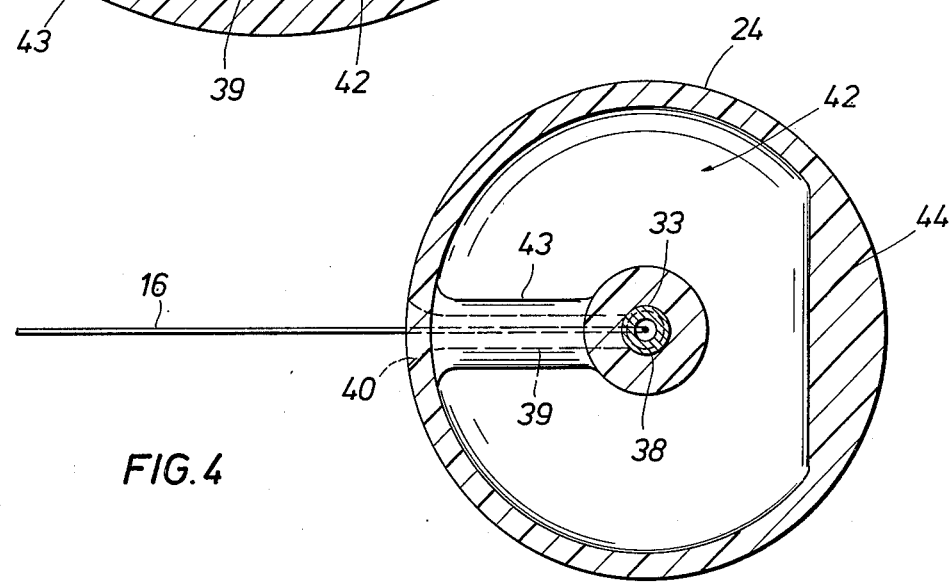
FIG. 4 is a simplified but different view, partly in cross section, of the head member depicted in FIGS. 1-3, and further showing how the string member is interconnected therewith.

Referring now to FIG. 4, there may be seen a different view of the head assembly 24 depicted in FIG. 3 and showing how the head assembly 24 is substantially a cup-like member with an internal cavity 42 for purposes of reducing the weight of this body. The tubular member 39 is, of course, supported within the head member 24 by means of a supporting rib portion 43 and a thickened portion 44 which acts as a counterweight with respect to the rib 43.

Referring now to FIG. 5, there may be seen a more detailed pictorial illustration of the spool 45 and actuator 47 which is interconnected with the flexible cable 17 to extend cutting line 16. In particular, the spool 45, which supports the coiled stored portion of cutting line 16, may be seen to be rotatably mounted on a shaft 46 having an enlarged portion 46A and fixedly mounted within the motor housing 15. As may be seen in FIG. 6, one flange of the spool 45 is provided with a Geneva-type gear arrangement which, in this instance, may include a shoulder 48 on the spool 45 with a configuration resembling a Maltese cross and being composed of eight projections 51 located to define four slots 52 and four concave surfaces 53. The actuator 47, in turn, is a circular member having a shoulder portion 50 which, in contrast, has two oppositely spaced-apart convex surfaces 54 and two oppositely spaced-apart concave surfaces 55. As indicated in FIG. 5, the actuator 47 also has a shaft portion 56 which is fixedly connected to the flexible cable 17 by means of some suitable means such as a retainer ring 58, and which is rotatably positioned within a sleeve 57 disposed within the motor housing 15. Accordingly, rotation of the flexible cable 17 results in corresponding rotation of the circular actuator 47 which, in turn, produces rotation of the spool 45.

Referring again to FIG. 6, it will be seen that rotation of the circular actuator 47 will tend to rotate the detent shoulder 50 so as to engage and rotate the Maltese-cross shoulder of the Geneva gear 48. When a pin 49 engages and enters a slot 52, this tends to rotate the spool 45 until the pin 49 exits that slot. While the pin 49 is within the slot 52, however, the adjacent projections 51 will be thrust into the concave surface 55 of the actuator 47. It will be noted that the convex surface 54 will mate with and slidably engage the concave surface 53, whereby rotation of the circular actuator 47 will not rotate the spool 45 unless and until a pin 49 actually enters a slot 52. This provides for extension of only a predetermined increment of cutting line 16. It will be noted that the free traveling end of the cutting line 16 will sometimes become entangled with some obstruction within the vegetation sought to be cut. Since the head assembly 24 rotates notwithstanding, this tends to place a drag upon the cutting line 16 which, in turn, would thereupon unreel the entire length cutting line 16 from the spool 45, but for the convex surface 54 of the actuator 47. The spool 45 cannot rotate as long as the actuator 47 is held in a fixed position and since the actuator 47 is only rotated in response to rotation of the flexible cable 17, the cutting line 16 cannot be accidently unwound.

Referring now to FIG. 7, there may be seen another view of the upper end portion of the motor housing 15, wherein the lid 20 is depicted as rotatable in a clockwise direction to expose and permit access to the spool 45. In this regard, it should further be noted that the spool 45 is supported within the housing 15 by means of a suitable support bracket 59 having a cradle recess 60 for engaging and bearing the shaft 46.

Figure 10:
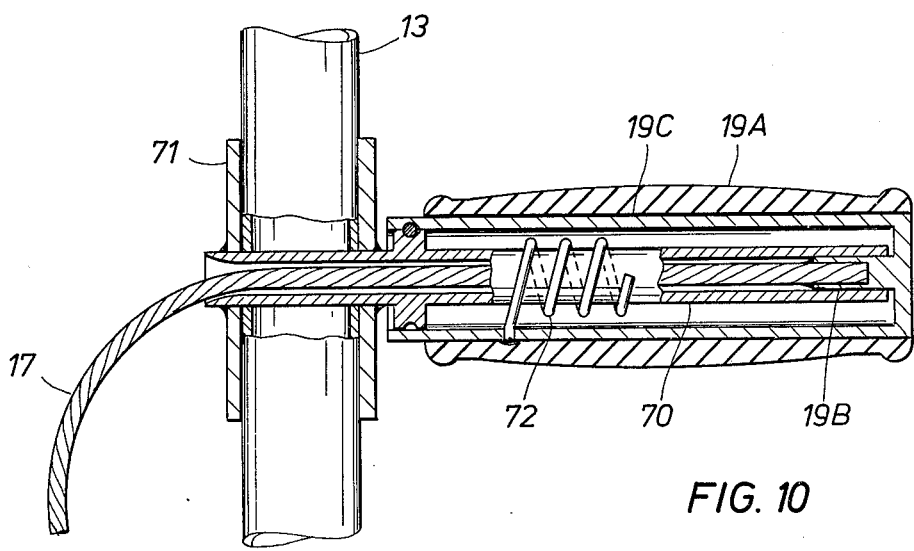
FIG. 10 is a simplified pictorial view, partly in cross section, of other apparatus suitable for use in operating either type of control mechanism.

Referring now to FIG. 10, there may be seen a more detailed illustration of the lower hand grip and feed control lever 19 wherein this assembly is shown as being composed of a suitable gripping member 19A disposed about a tubular member 19C having an internal portion 19B which, in turn, is fixedly connected to the upper end of the flexible cable 17 so that rotation of the tubular member 19C will produce rotation of the flexible cable 17. The tubular member 19C is further rotatably mounted on a fixedly positioned hollow shaft 70 which, in turn, is connected to a mounting sleeve 71 interconnected with the handle 13. A suitable spring member 72 is preferably included as depicted in FIG. 10 to permit rotation of the tubular member 19C in only one direction and to therefore prevent the cutting line 16 from being drawn into the head member 24.

Figure 8:
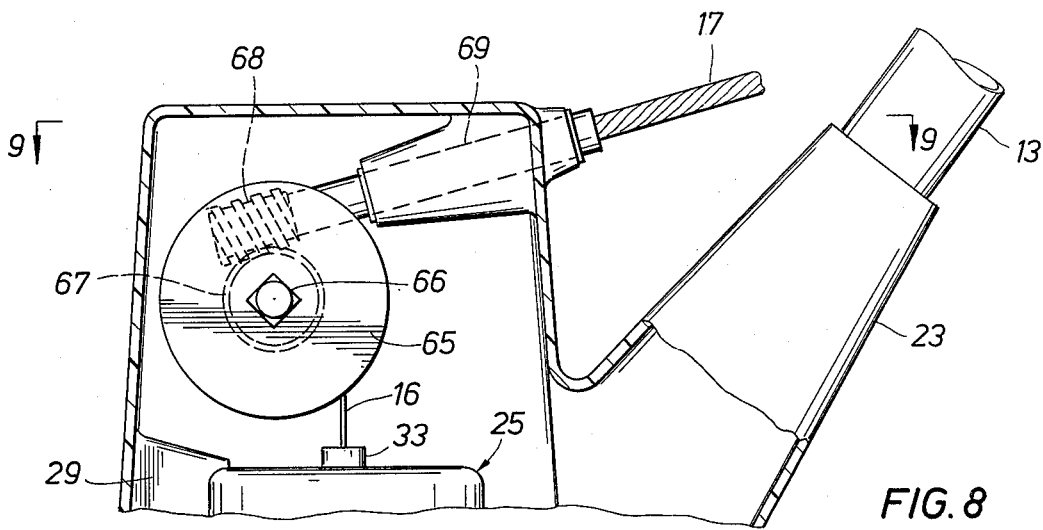
FIG. 8 is a simplified pictorial view of the upper end of the motor housing in the trimmer depicted in FIGS. 1-7, but showing an alternative form of actuating mechanism for use with the feed mechanism hereinbefore described.
Figure 9:
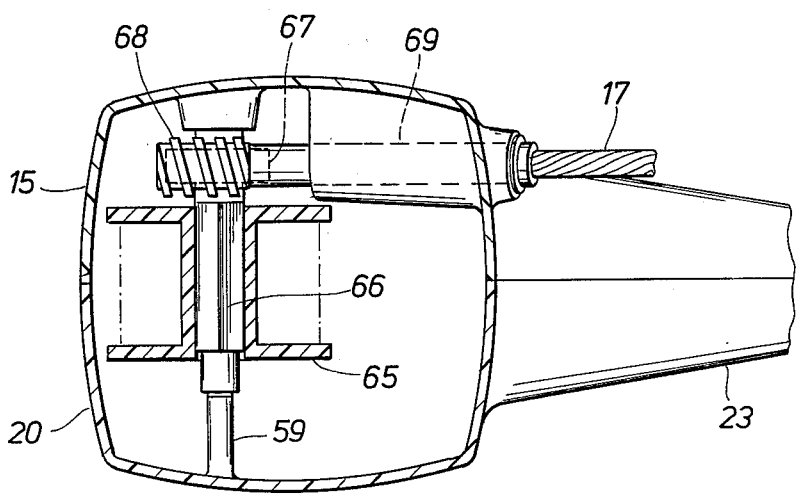
FIG. 9 is another different pictorial view of the apparatus depicted in FIG. 8.

Referring now to FIGS. 8 and 9, there may be seen an illustration of an alternative means for feeding replacement lengths of cutting line 16. More particularly, the coil portion of the cutting line 16 may be suitably mounted in a conventional manner upon a spool member 65 which, in turn, is disposed on a square shaft 66, as depicted, and which is further provided with a worm gear 67 which is engaged with a worm 68 on the end of a worm shaft 69. The flexible cable 17 is fixedly connected to the worm shaft 69, whereby rotation of the flexible cable 17 will rotate the spool 65.

As hereinbefore noted, the free traveling end of the cutting line 16 will occasionally become ensnarled with an obstruction in the vegetation sought to be cut, thereby tending to draw the entire length of cutting line 16 from the trimmer assembly 12. With the feed mechanism depicted in FIGS. 8 and 9, this is impossible since the worm 68 will only rotate in response to rotation to the flexible cable 17, and since the worm gear 67 on the spool 65 cannot rotate the worm 68.

Referring again to FIG. 3, it will be noted that the inside diameter of the motor shaft 33 is preferably large enough to permit the cutting line 16 to revolve freely therein and also to permit the cutting line 16 to move longitudinally therein without binding. In this respect, the upper end of the motor shaft 33 may preferably have a flared opening to permit easy threading of the cutting line 16 into the shaft 33. The end 41 of the tube 39, which is adjacent the lower or opposite end of the motor shaft 33, may also be flared for the same reason.

Although the present invention has been discussed with respect to only a single cutting line, it is nevertheless within the scope of the invention to provide for mechanical feed of a plurality of such lines which, of course, will extend from different locations about the periphery of the head member. All of the lines may be threaded through the hollow motor shaft 33, as depicted in FIG. 3, but the head member must be provided with a separate metal tubular member for each such line member. Furthermore, each line must have its coiled portion arranged on a separate storage spool to prevent entanglement within the hollow motor shaft 33 during or as a result of rotation of the head member 24. In addition, each spool will require a separate actuating mechanism, unless it is provided that all spools be rotated in synchronism, as in the case of the apparatus of U.S. Pat. No. 3,664,102, whereupon only one such actuating mechanism will be needed.

Many other modifications and alternatives to the apparatus and techniques hereinbefore described will be readily apparent to those of ordinary skill in this art. Accordingly, the structures and techniques described herein and depicted in the accompanying drawings are intended to be exemplary only and are not intended as limitations on the scope of this invention.

What is claimed is:

1. Apparatus for cutting vegetation and the like, comprising:
   (a) a rotatable head member having a tubular passageway extending therethrough between its periphery and a point adjacent its axis;
   (b) driving means axially interconnected with said head member for rotating said head member in a cutting plane, and said driving means including a hollow rotatable shaft member interconnecting at one end to said passageway in said head member;
   (c) a flexible non-metallic line member having a coiled portion positioned independently of rotation of said head member, and from said coiled portion, an unwound portion extending through said hollow shaft and said passageway and radially from adjacent the periphery of said head member to provide a free-traveling cutting end arcuately movable in said cutting plane;
   (d) feed means for selectively unwinding and extending additional lengths of said line member from said periphery of said head member and for anchoring said line member against being drawn from said head member;
   (e) said feed means including storage spool means for supporting said coiled portion of said line member and rotatably positioned adjacent said hollow shaft of said driving means;
   (f) a revolvable flexible shaft member;
   (g) actuator means interconnecting said flexible shaft member and said storage spool means and rotatable in response to rotation of said flexible shaft member; and
   (h) said actuator means further being non-rotatable in response to rotation of said spool means independently of rotation of said flexible shaft member.

2. The feed means described in claim 1, wherein said actuator means further anchors said spool means against drag applied to said line member at the periphery of said head member.

3. The feed means described in claim 2, wherein said actuator means is further adapted and arranged to rotate said spool means through a preselected discrete increment of arcuate travel.

4. The apparatus described in claim 2, wherein said head member further comprises a tubular member to provide a metallic bearing surface for said line member within said head member.

5. The apparatus described in claim 4, wherein said tubular member has a flared end portion at the periphery of said head member for providing a curvilinear bearing surface for supporting said line member against angular deformation during rotation of said head member by said driving means.

6. The apparatus described in claim 5, wherein said tubular member also has another curvilinear surface at the axis of said head member for supporting said line member during revolvement in said tubular member.

7. The apparatus described in claim 1, wherein said feed means comprises,
- a spool member rotatably supporting said coiled portion of said line member,
- a flexible cable-like shaft member arranged for revolvement about its longitudinal axis, and
- actuating means for rotating said spool member in response to revolvement of said cable-like shaft member and for anchoring said spool member against rotation independently of said cable-like shaft member.

8. The apparatus described in claim 7, wherein said cable-like shaft member is arranged with one end located adjacent said head member and with the other end located remote to said head member.

9. The apparatus described in claim 8, wherein said spool member includes a shoulder portion having a configuration functionally corresponding to the driven portion of a Geneva-type gear assembly and said actuating means includes a rotatable member having a configuration corresponding functionally to the driving portion of a Geneva-type gear assembly.

10. The apparatus described in claim 8, wherein said spool member includes a shoulder portion having a configuration corresponding functionally to a worm gear and wherein said actuating means has a portion having a configuration functionally corresponding to a worm.

11. In an apparatus for cutting vegetation including a head member having an axis of rotation perpendicular to a cutting plane and further having an aperture adjacent its perimeter, driving means for rotating said head member about said axis, a flexible non-metallic line member in an uncoiled portion disposed at least partially within said head member and extending from said aperture into the cutting plane, the improvement comprising:
- (a) storage spool means carrying a coiled portion of said line member and interconnected with the uncoiled portion of said line member disposed in said head member, said storage spool means mounted for rotation relatively to said head member; and
- (b) actuator means controlling rotation of said storage spool means to uncoil selectively a portion of said line member and extend said line member from said aperture by a predetermined increment into the cutting plane during rotation of said head member.

12. In an apparatus for cutting vegetation and the like, including a head member having an axis of rotation perpendicular to a cutting plane, driving means for rotating said head member about said axis, a flexible non-metallic line member in an uncoiled portion disposed at least partially within said head member and extending from said head member via an aperture adjacent its periphery and into the cutting plane, a rotatable storage spool means carrying a coiled supply of said line member and interconnected with the uncoiled portion of said line member in said head member, the improvement comprising:
- (a) first means for securing said spool means against rotation;
- (b) second means for controlling said spool means for rotation through a certain angular displacement to extend only a predetermined increment of said line member from said head member into the cutting plane and then securing said spool means against rotation; and
- (c) third means for actuating said second means during rotation of said head member.

13. The apparatus of claim 12 wherein said spool means includes a shoulder portion having a configuration functionally corresponding to the driven portion of a Geneva-type gear assembly forming said first and second means, and said third means includes a rotatable member having a configuration corresponding functionally to the driving portion of a Geneva-type gear assembly.

14. An apparatus for cutting vegetation and the like comprising:
- (a) a head member having an axis of rotation perpendicular to a cutting plane and further having an aperture adjacent its perimeter;
- (b) driving means for rotating said head member about said axis;
- (c) line storage means containing a coiled supply of flexible non-metallic line member;
- (d) said flexible non-metallic line member disposed at least partially within said head member to extend through said aperture into the cutting plane;
- (e) first means adapted for uncoiling said line member from said line storage means and feeding said line member through said head member and from said aperture into the cutting plane;
- (f) second means for selectively changing said first means from a line member non-feeding condition into a line member feeding condition wherein said line member is uncoiled from said line storage means; and
- (g) third means for returning said first means into the line member non-feeding condition only upon a predetermined increment of said line member being extended from said aperture during rotation of said head member.

15. The apparatus of claim 14 wherein said line storage means is a spool means carrying the coiled supply of said line member and said spool means is mounted for rotation relative to said head member to provide said first means to uncoil said line member and extend same from said aperture into the cutting plane.

16. The apparatus of claim 15 wherein said second means are gear means to secure said spool means against rotation in the line member non-feeding condition and to control rotation to a predetermined angular displacement of said spool member in the line member feeding condition.

17. The apparatus of claim 16 wherein said third means are said gear means for securing said spool means against rotation only upon a predetermined increment of said line member being extended from said aperture into the cutting plane.

18. The apparatus of claim 17 wherein said gear means are a Geneva-type gear assembly.

19. An apparatus for cutting vegetation and the like, comprising:
- (a) a head member arranged for rotation about an axis generally perpendicular with a cutting plane;
- (b) driving means for rotating said head member;
- (c) said head member having an aperture provided therein at a location spaced from the axis of rotation;
- (d) a spool member carrying a coiled supply of a flexible non-metallic line member and mounted for uncoiling said line member;
- (e) said line member extending from said spool member and disposed at least partially within said head member and extending through said aperture whereby uncoiling said line member extends same from said aperture into the cutting plane;

(f) first means for securing said line member against uncoiling on said spool member;

(g) second means for controlling the uncoiling of said line member carried on said spool member to a certain amount to extend only a predetermined increment of said line member from said head member into the cutting plane and then securing said line member carried on said spool member against uncoiling; and (h) third means for actuating said second means during rotation of said head member.

20. The apparatus of claim 19 wherein said spool member is mounted for rotation relative to said head member in uncoiling said line member and gear means provide for securing said spool member against unintended rotation and for controlling the uncoiling of said line member during rotation of said spool member.

21. The apparatus of claim 20 wherein said gear means are a Geneva-type gear assembly.

22. The apparatus of claim 20 wherein said gear means secure said spool member against rotation after only a predetermined increment of line member is extended from said aperture into the cutting plane during rotation of said head member.

23. The apparatus of claim 19 wherein said third means is a mechanism shifted between first and second positions for actuating said second means.

24. The apparatus of claim 23 wherein said mechanism is an actuator moved by a hand of the apparatus user.

25. An apparatus for cutting vegetation and the like, comprising:

(a) a head member having an axis of rotation perpendicular to a cutting plane and further having an aperture adjacent its perimeter, (b) driving means for rotating said head member about said axis, (c) a flexible non-metallic line member disposed at least partially within said head member, and (d) feed means to uncoil selectively a portion of said line member during rotation of said head member and for dispensing said line member from said aperture into said cutting plane during the cutting of vegetation.

26. The apparatus of claim 25 wherein said feed means dispenses a predetermined increment of said line member into the cutting plane.

27. The apparatus of claim 26 wherein said feed means controls uncoiling of said line member from a spool member carrying a coiled supply of said line member.

28. The apparatus of claim 25 wherein a rotatable storage spool means carries a coiled supply of said line member, and said feed means controls rotation of said spool means for dispensing a predetermined increment of said line member into the cutting plane.

29. Apparatus for cutting vegetation and the like, comprising:

(a) a rotatable head member having a tubular member extending therethrough between a first point at its periphery and a second point adjacent one end of the axis of said head member;

(b) driving means having a hollow rotable shaft member fixedly interconnected with said tubular member at said point along said axis thereof;

(c) a flexible non-metallic line member having a coiled portion positioned independently of said rotation of said head member and an unwound portion extending through said hollow shaft member and said tubular member to said periphery of said head member to provide a free-traveling cutting end arcuately movable in a cutting plane defined by said rotatable head member; and (d) feed means for selectively unwinding additional predetermined incremental lengths of said line member for extension from said periphery of said head member during rotation thereof and for anchoring said line member against being drawn from said head member during the cutting of vegetation.

* * * * *

Notice of Adverse Decision in Interference

In Interference No. 100,928, involving Patent No. 4,211,004, D. M. Woods, STRING-TYPE WEED CUTTER WITH MECHANICAL LINE FEED, final judgment adverse to the patentee was rendered Dec. 19, 1983, as to claims 11, 14, 15 and 25–29.

*[Official Gazette April 1, 1986.]*